April 16, 1963

R. L. WEBER III 3,085,719

METERING LIQUID DISPENSER

Filed April 14, 1959

INVENTOR
ROBERT L. WEBER III

BY *H.B. Willson & Co.*

ATTORNEYS

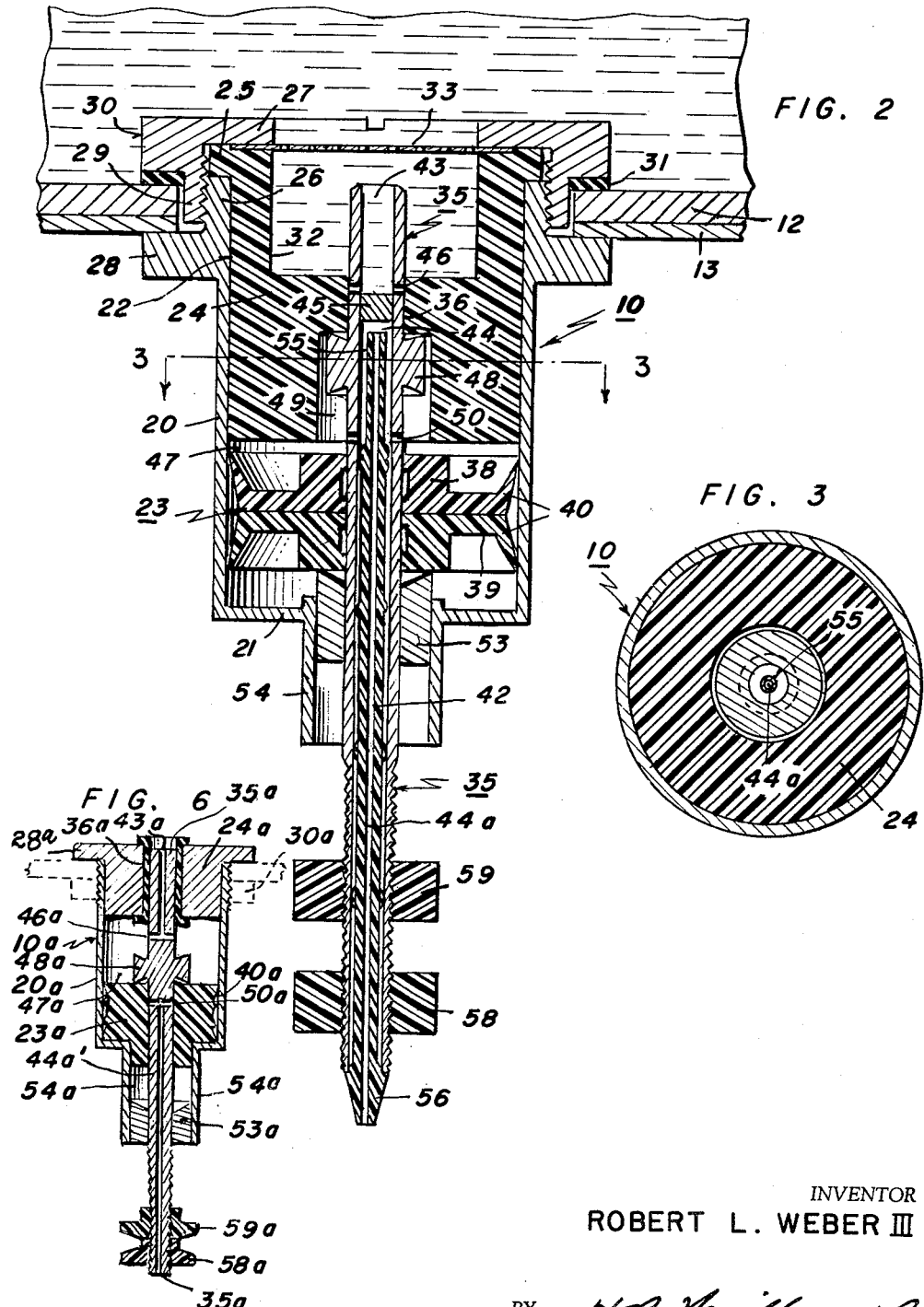

United States Patent Office 3,085,719
Patented Apr. 16, 1963

3,085,719
METERING LIQUID DISPENSER
Robert L. Weber III, 19 Judson Court,
Huntington, Conn.
Filed Apr. 14, 1959, Ser. No. 806,243
16 Claims. (Cl. 222—309)

This invention relates to liquid dispensing or metering apparatus and particularly to devices for measuring liquid in drops or other small quantities.

While such metering means has various uses in the chemical, medical and industrial arts, it is particularly suitable for use in electrical incense vaporizers used in the industrial, commercial and consumer markets. In some forms of such vaporizers small quantities of a liquid essence or incense are periodically dropped upon an electrically heated plate or the like and volatilized, so that a pleasing odor or smell is given off in any room or space where it is desired to have a pleasant odor either for the sake of the odor itself or to override unpleasant odors such as occur in toilet rooms, kitchens or the like, or so that a particular odor is given off in proximity with the display and sale of some merchandise such as food products, perfumes or toilet goods.

One object of the invention is to provide an improved precision metering means for discharging liquids in small quantities.

Another object of the invention is to provide a precision measuring means which will dispense small quantites of liquid such as a predetermined number of drops per minute or other unit of time, when power actuated.

Another object is to provide such a drop discharging device which may be easily adjusted to vary the number of drops discharged per minute within a predetermined range.

Another object is to provide a pump-like measuring device of this character in which a free or floating piston is used to discharge the liquid through a very small valve opening or passageway, and a reciprocatory element with a discharge bore serves both as a valve device and a piston actuator, whereby the liquid from a supply source is forced out of the device in drops or other very small quantities per unit of time when power actuated.

Another object is to provide in connection with the reciprocatory discharge element, means for preventing bleeding of the liquid through the discharge bore under certain conditions.

Another object is to provide power means for actuating the reciprocatory element which will permit the effective stroke of the piston to be varied to control the number of drops discharged per unit of time.

With the above and other objects and advantages in view, the invention resides in the novel combinations and arrangements of parts and the novel features of construction hereinafter described and claimed, and illustrated in the accompanying drawings which show the preferred embodiments of the invention.

In the drawings:

FIG. 2 is an enlarged vertical sectional view through the body of the device and a portion of the liquid supply tank from which it depends;

FIG. 3 is a detail transverse section on line 3—3 in FIG. 2;

FIG. 6 is a vertical section on an enlarged scale through a form of the device in which the anti-bleed tube is not used.

Figure 1:
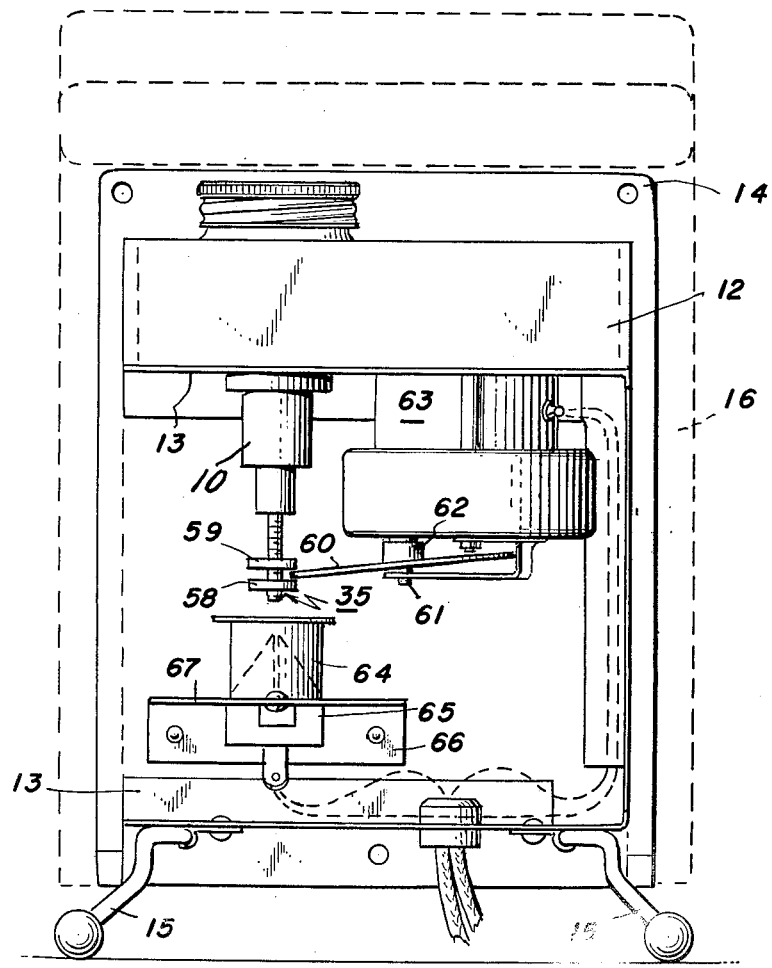
FIG. 1 is a vertical sectional view through one form of incense vaporizer in which my new drop forming device may be used, the casing of the vaporizer being shown in dotted lines.
Figure 4:
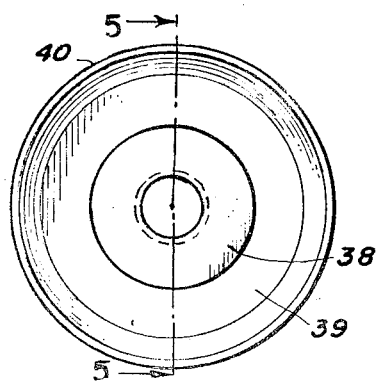
FIG. 4 is an end view of the piston.
Figure 5:
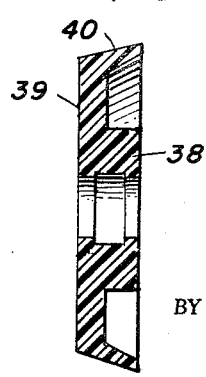
FIG. 5 is an enlarged detail section through one of the half sections of the piston.

Referring more in detail to FIGS. 1–5 of the drawings, the numeral 10 denotes as a whole the body of my pump-like drop-forming or metering device. When it is used in a liquid vaporizer, such as shown in FIG. 1, the body depends from the bottom of a liquid supply tank 12 mounted on the upper portion of a bracket plate 13 which projects forwardly from an upright supporting back plate 14. The plate 14 may be suspended from a wall or foldable legs 15 may be provided on the lower portion of the bracket 13 to support the vaporizer on a table or the like. For appearance a casing 16 may be removably mounted on the back plate to enclose the above parts as well as the power means for actuating the pump-like drop former and the electrically heated cup or plate which vaporizes the liquid drops as they fall from the device 10, as later described.

The body 10 includes an intermediate tubular portion 20 of cylindrical shape, a lower portion 21 and an upper portion 22 by means of which the device is attached to the tank 12. A piston 23 is slidable along the smooth inner wall of the cylinder 20 between bottom portion 21 and a bushing 24 which forms a part of the upper portion 22 of the body. The bushing or top member 24 has a cylindrical body portion which fits the upper portion of the cylinder and is supported by an annular radially projecting flange 25 at its top. This flange is clamped on a thickened and externally screw threaded portion 26 of the top of the body by a screw cap or ring 27 engaged with the threaded portion 26. The ring 27 also serves to clamp the body 10 in an opening in the bottom of the tank 12 and in the bracket plate 13, as seen in FIG. 2. Formed on the body beneath its threaded upper end 26 is a radially projecting annular flange 28 adapted to engage the outer face of the plate. The holes in these parts are of slightly greater diameter than the external diameter of the lower portion 29 of the ring that engages the threaded top 26 of the body. The diameter of the top portion 30 of the ring 27 is greater than that of its lower portion 29 and that portion 30 overlies the upper face of the tank bottom around the hole and also overlies the body flange 28. A gasket ring 31, preferably of butyl rubber, is used between the ring and the tank bottom to provide a liquid tight connection when the ring is screwed down on the top part 26 of the body. In the top of the bushing 24 is a large liquid recess 32 that is in communication with the interior of the tank through the opening in the clamping ring. The latter may also be used to clamp a fine screen 33 across the upper portion of the recess.

The vertically movable piston 23 is of such construction that it slidably grips the wall of the cylinder 20 and will reciprocate only on the application of force. Extending slidably through the free piston is a centrally located reciprocating element 35 which serves both as a piston actuator and a valve device for controlling the movement of liquid from the tank or the recess 32, and discharging it in drops or small quantities from the lower end of the device into a suitable bottle or other receptacle or onto a hot plate if the device is used in a vaporizer. The element 35 is in the form of a cylindrical rod or stem having its upper portion guided in a central bore 36 in the bushing 24 and extending into the recess 32 or into the tank, while its lower portion is preferably guided in the bottom portion 21 of the body and extends downwardly below the latter. On the element 35 are upper and lower shoulders or abutments to engage and move the piston as the element is reciprocated either manually or mechanically as by power actuated means, as later explained.

The piston 23 has a hub portion 38, a web portion 39 and two tapered, annular, oppositely-projecting, peripheral wing portions 40 which are somewhat flexible and resilient. While the piston may be made in one piece, it is shown as composed of two identical half sections with their flat faces placed in contact, one of the halves being shown in FIG. 5. The hub 38 has a bore with a diameter about .0003″ smaller than the outside diameter of the rod or stem 35 to permit the latter to slide in the piston and to prevent leakage of the liquid between these parts. The pointed or tapered wing-like peripheral portions 40 of the piston have an outside diameter of from .002″ to .003″ larger than the inside diameter of the cylinder 20 and their resilient flexibility is just enough to give them a slight pressure on the cylinder wall to assure a perfect liquid seal and to hold the piston until it is moved by the reciprocation of the actuator 35. If the piston is made in one or two parts, I have found that the plastic material marketed by E. I. Du Pont de Nemours under the trademark "Teflon" is highly satisfactory. "Teflon" D50–60, tetrafluorethylene resins, is a plastic that has many desirable properties including toughness and flexibility as well as a certain amount of "cold flow" which insures additional sealing characteristics. These peripheral cylinder-engaging portions 40 of the piston preferably have an outside taper of 10° and an inside taper of 25° so that they are substantially V-shaped in cross section and give the piston an undercut opposite the back wall or web portion 39.

The bushing 24 is also made of "Teflon" or a similar plastic although in the form shown in FIG. 6, it is made of brass or other metal and has a "Teflon" lining in its bore as later described.

The body 10 is preferably made of metal as is also the rod or stem 35, but the latter, in the preferred form, contains a fixed anti-bleed tube 42 which forms a part of it and which is made of "Teflon." When the tube 42 is used, the element 35 may be a tubular rod the bore of which is divided into upper and lower bore portions or chambers 43 and 44 by a plug 45. This plug is positioned in the portion of the tube that reciprocates in the bore 36 of the bushing and is disposed below a transverse opening 46 that coacts with the bushing to form a valve port that controls the passage of liquid from the upper bore 43, or the recess 32, into the cylinder chamber 47 between the top of the piston and the bottom of the bushing. This chamber it will be noted is of small volumetric capacity. The rod or tube 35 has on its upper portion a fixed annular collar or flange 48 which moves in a cylindrical recess 49 formed in the center of the bottom of the bushing. The flange 48 is disposed above the hub of the piston and serves as an actuator to move the piston downwardly during at least some part of the downstroke of the element 35, and also serves to limit the up stroke of the element by engaging the inner end or bottom of the recess 49. The ends of the cylindrical collar or abutment 48 are preferably undercut as shown to effect a better sealing engagement with the flat top of the hub 38 and the flat bottom of the recess 49. Formed in the tube 35 is a second and lower transverse opening 50 which coacts with the hub 38 in forming a valve port that permits the liquid to move from the cylinder chamber 47 into the lower bore portion 44 during some part of the upward stroke of the element 35, as presently explained. Also fixed to that element below the piston is a lower cylindrical flange or collar 53 which serves to move the piston upwardly and to guide the element. The collar or abutment 53 has a sliding but not airtight fit in a reduced cylindrical extension 54 on the bottom 21 of the cylinder. A portion of this guiding extension projects above the bottom wall 21 and serves as a stop to limit the downward movement of the piston. The upper end of the collar is preferably undercut or dished as shown to effect a better sealing engagement with the flat lower end of the hub of the piston. The collar 53 is forced on or adjustably fixed on the element after the piston has been placed thereon.

The chamber 47 is not a measuring chamber and in order to discharge the liquid in drops or other quantities, the liquid must be moved by the action of the piston through very small openings or passages. The latter may be the valve ports 50 and 46, or they may be the bores in the element 35, or both. So far as the movement of the liquid under the action of the piston is concerned, the ports 46 and 50 together with the bores 43 and 44 form passageways for the flow of the liquid, since, when the element 35 moves downwardly the flow is through 43 and 46 into the chamber 47–49, and, when it moves upwardly, the flow is from the chamber 47 through 50 and 44. When the tube 43 is used, the flow is through the port or ports 50, a part of the bore 44 and the bore 44$^a$ of that tube. It will therefore be seen that the ports form portions of the passageways.

Preferably, and as shown in FIGS. 2 and 6, these small valve ports 46, 46$^a$ and 50, 50$^a$ have the same sizes for a device which is to handle a particular liquid. If the ports or passageways are too large, those liquids having a viscosity such as do alcohol and ether, will flow too freely by gravity. On the other hand if they are too small the liquids will not move freely even under pressure from the piston. Different essences used in vaporizers have different viscosities and for such use of the metering device, the valve ports 46 and 50 must be of a size to which will accommodate all such liquids without permitting gravity flow of those that are most viscous. I have established by tests that such liquids will be dropped in a satisfactory manner if the valve ports 46 and 50 or some portions of the passageways have a size of between .026″ and .028″, but depending upon the viscosity of the liquid, they may vary from .025″ to .030″.

In the preferred embodiment the fine or capillary bore 44$^a$ which is formed in the tube 42 and forms the lower part of the bore or chamber 44, may have the same size as the valve ports 46 and 50. The tube 42 has a suitable friction fit, as by longitudinally spaced annular ribs, in the tubular lower portion of the rod or element 35 and at its upper end is a reduced portion 55 which terminates in spaced relation to the plug 45. At the lower end of the tube 42 is an enlarged discharge head 56 shouldered to abut the lower end of the element 35. When the tube is pushed all of the way up into the latter, the lower part of its reduced portion 55 will be a little below the valve port or ports 50 and the open top of that portion will be at the normal level of the liquid in the chamber 47 so that upon upward movement of the piston the pressure created in the chamber will force the liquid down the tube and cause it to drop from the lower end of the element 35. If the anti-bleed tube 42—55 is not used, and the piston should stop with the valve port 50 open, pressure in chamber 47 would cause liquid in the chamber above that port to bleed down the bore 44 or 44$^{a'}$. It is the pressure of the liquid in the top chamber that forces the liquid through the opening or bore.

While the combined valve device and piston actuator 35 may be manually reciprocated, it is preferably power actuated. Further the actuating means is such that the element 35 may be moved a full stroke or a partial stroke in a predetermined time interval for the purpose of varying the stroke of the free piston and hence varying the number of drops discharged during each cycle of operation. The preferred form of driving means shown in FIG. 1 comprises a pair of longitudinally spaced abutments 58 and 59 on the lower portion of the element 35 and a power actuated member 60 disposed between them and adapted to alternately engage and move them. The member 60 may be a swash plate or disk set obliquely on a rotating shaft 61 to act as a cam to reciprocate the element. The flexible cam disk 60 is of resilient metal with a hub 62 fastened to the shaft by a set screw or the like. The shaft 61 may be driven by an electric motor through speed reduction gearing or may be the shaft of a synchronous motor making one revolution per minute. However the to-and-fro motion caused by the rotation of the disk, may be produced by the flexing movement of a bi-metal strip forming a part of a heat motor, or by an electromagnetic device or other form of actuator having a proper cycle of operation. Also as shown in FIG. 1, the element 35 is above a cup 64 associated with an electrical resistance heating unit 65, both supported on a flange 67 of an angle bracket 66 projecting forwardly from the back plate 14. Drops of liquid falling from the element 35 onto the cone-shaped bottom of the cup are quickly vaporized or converted into a gas which leaves the casing 16 through an open top.

By making the abutments 58 and 59 relatively adjustable on the element 35, the length of the stroke of the latter may be varied even though the length of the stroke of the cam or other actuator 60 is fixed. That adjustment may be effected by externally screw threading the lower portion of the rod or element 35, as shown in FIG. 2, and making the abutments in the form of internally threaded disks which may also be made of "Teflon." The lower disk or cam follower 58 may be suitably fixed after it has been adjusted so that the flexibly resilient cam disk exerts a slight pressure on it when the piston 23 is at the bottom of its stroke. If the upper disk or cam follower 59 is then adjusted toward the lower one so that the space between them is only the thickness of the cam disk, the element 35 will be given its maximum stroke, and therefore the piston will be moved the full distance within the chamber and will cause the discharge of the maximum number of drops per time cycle for the particular pump range which may be ten drops per minute. If it is desired to discharge a lesser number of drops, the upper follower 59 is adjusted so that there is more space between the cam followers. Then as the cam disk or other actuator 60 starts its upward stroke, there is a delay before it comes in contact with the upper follower. When the actuator 60 is a cam disk, the delay is due to the fact that the cam is inclined and rotates a certain distance before it comes in contact with the upper follower. That results in the cam pushing the element 35 less than a full stroke and therefore the piston 23 is pushed less than a full stroke. With a piston of given diameter, the only variable is the length of its stroke and that is controlled by adjusting the cam followers.

FIG. 2 shows a device, four times actual size, designed to discharge from one up to ten drops per each cycle of operation of the cam or actuator 60, the liquid having the viscosity of alcohol or ether. The bore 44$^a$ or the valve ports 46 and 50 may be from .0260" to .0280" and the stroke of the piston 23 is varied from .000" to .050", with the internal diameter of the cylinder chamber 47 about .50". FIG. 2 shows the piston actuating rod or element 35 in its top position with the inlet valve port 46 closed and the discharge valve opening 50 open. As the rod or element 35 is moved down the opening 50 moves into the piston and is thus closed, and then the opening 46 moves below the bore 36 in the bushing and into communication with the chamber 47. After the upper valve 46 is opened the collar 48 on the element engages and moves the piston 23 downwardly thereby creating a vacuum which sucks the liquid from the chamber 43 or the recess 32 through the small valve port 46 into the chamber 47. The parts 43 and 32 are at the bottom of the tank 12 which has a vented filling cap. The down stroke continues until stopped by the piston engaging the stop on the bottom wall 21. Upon the upstroke of the element the cycle is reversed, the upper valve opening or openings 46 being closed by moving into the bushing 24 and the lower valve opening or openings 50 being opened by moving above the hub of the piston; and then the collar 53 engages and moves the piston upwardly. The pressure in the cylinder chamber 47 caused by the upward movement of the piston forces the liquid into the bore chamber 44 and down the small bore 44$^a$. The valve ports 46 and 50 are also of from .0260" to .0280" although they may be larger when the bore 44$^a$ is of the small size previously mentioned.

The form of the invention shown in FIG. 6 differs from the first form in that the anti-bleed tube is not used, the piston is made of one piece of "Teflon," and the manner of constructing and mounting the upper part of the body of the device is a little different. However since the principal parts of the two devices are the same or substantially the same and perform the same functions, the corresponding parts will bear the same numerals with exponents. The piston 23$^a$ has a solid cylindrical body with its peripheral portion formed with a plurality of annular ribs 40$^a$ of angular shape in cross section which yieldably grip the wall of the cylinder 20$^a$ and correspond to the parts 40. At the bottom of the "Teflon" piston is a reduced extension which slides freely in the depending guide cylinder 54$^a$ at the bottom of the body 10$^a$. Fixed in the top of the cylinder 20$^a$ is a metal top member or bushing 24$^a$ with a central bore lined with a "Teflon" bushing 36$^a$ in which the upper portion of the element 35$^a$ is slidable. The cylinder 20$^a$ has an external diameter less than the hole in the bottom of the tank and its upper part is externally screw threaded to receive a ring nut 30$^a$ adapted to be screwed against the bottom of the tank to clamp the latter between it and an outwardly extending flange 28$^a$ formed at the top of the bushing 24$^a$. The combined valve device and piston actuator element 35$^a$ is made from a solid cylindrical rod which slides in the piston 23$^a$ and in the bushing 36$^a$. On its upper portion is the upper fixed flange or collar 48$^a$ disposed in the cylinder chamber 47$^a$ and coacting with the top of the piston and a flange at the lower end of the "Teflon" bushing or liner 36$^a$. On the lower portion of the element is the lower adjustably fixed flange or collar 53$^a$ which is guided in the extension 54$^a$ and which coacts with the bottom of the piston or its extension. On the protruding lower screw threaded end of the element are the adjustable cam follower disks 58$^a$ and 59$^a$ which coact with the cam disk or other actuator 60. In the upper portion of the rod or element 35$^a$ is an upper bore 43$^a$ the top of which is in communication with the liquid in the tank and the bottom of which is in communication with the transverse upper or inlet valve port 46$^a$ adapted to be closed by the bushing 36$^a$. In the lower portion of the element is the lower bore portion 44$^{a\prime}$ which serves as the liquid discharge and which has its upper end in communication with the lower valve port 50$^a$ adapted to be closed when it is within the bore of the piston. In this form as in the first, it is the differential of friction between the cylinder wall and the periphery of the piston and between the rod or element and the bore of the piston that allows the element to slide freely without moving the piston until mechanical contact is made between one or the other flanges or collars on the element and the ends of the piston. The piston 23$^a$ is operated in the same manner as the piston 23 to suck the liquid into the chamber 47$^a$ and discharge it therefrom, the length of the piston stroke determining the number of drops discharged during each cycle of operation of the disk cam or actuator 60 and being varied by the adjustment of the followers 58$^a$ and 59$^a$. FIG. 6 shows a device twice normal size for delivering from one to ten drops per cycle of operation of the actuator of a liquid having the viscosity of alcohol or ether. The internal diameter of the cylinder 47$^a$ is .50", the maximum piston stroke is .040" and the bores 43$^a$ and 44$^{a\prime}$ and the valve ports 46$^a$ and 50$^a$ are .027" nominal. The valve ports 46$^a$ and 50$^a$ are shown of the same size as the bores but may be larger. As previously stated the size of these small passageways may vary from .025" to .030", depending upon the viscosity of the liquid. The embodiments shown in FIGS. 2 and 6 are for dispensing liquids in drops but liquids in larger quantities may be dispensed if the diameter of the chamber and the stroke of the piston are changed without necessarily changing the size of the passageways. Another important feature of the device resides in the positioning of the upper and lower valve ports in the piston rod since they must be positioned to operate in timed sequence relative to the upstroke and downstroke of the actuator 60.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a metering liquid dispenser, the combination of an upright body having a cylindrical piston chamber and a top portion provided with a central bore, a free piston slidable in said chamber and provided with an alined central bore, said piston being normally held against reciprocation by the frictional engagement of it with the wall of said chamber, a reciprocable combined piston-actuator and valve element having an upper part slidable in the bore of said top portion and a lower part slidable in the bore of said piston and extending below the latter, said element having means engageable with opposite sides of said piston to move the same during at least a portion of each stroke of the element, said element also having upper and lower liquid passageways coacting respectively with said top portion and with said piston for controlling the flow of a liquid from a supply source into said chamber above the piston and for controlling the discharge of the liquid from said chamber, and means for reciprocating said element.

2. The combination of claim 1 together with valve ports in said element forming portions of said upper and lower passageways, said valve port in the upper passageway being covered and uncovered alternately by said top portion as said element is reciprocated and said valve port in said lower passageway being covered and uncovered alternately by said piston as said element is reciprocated.

3. In a metering liquid dispenser, the combination of an upright body having a cylindrical piston chamber and a top portion provided with a central bore, a free piston slidable in said chamber and provided with an alined central bore, said piston being normally held against reciprocation by the frictional engagement of it with the wall of said chamber, a reciprocable valve-element having an upper part slidable in the bore of said top portion and a lower part slidable in the bore of said piston and extending below the latter, said element having upper and lower liquid passageways coacting respectively with said top portion and with said piston for controlling the flow of a liquid from a supply source into said chamber above the piston and for controlling the discharge of the liquid from said chamber, a first abutment on said element above the piston to move the latter downwardly during at least a part of the down stroke of the element, a second abutment on said element below the piston to move the latter upwardly during at least a part of the upstroke of the element, and means for reciprocating said element.

4. The combination of claim 3 in which said reciprocating means includes a power-actuated actuator for imparting a to-and-fro motion and spaced followers on the lower part of said element receiving said actuator between them and alternately moved by said actuator, at least one of said followers being adjustable to vary their spacing.

5. The combination of claim 3 in which said reciprocating means includes a power-driven rotary shaft having a circular disk disposed in a plane at an acute angle to its axis to serve as a cam plate and a pair of relatively adjustable cam followers on the lower part of said element receiving the peripheral edge of said disk between them and alternately moved by the rotation of the disk.

6. The combination of claim 5 in which said disk is made of resilient material, whereby its edge portion may flex.

7. The combination of claim 3 in which said element comprises a stem with a cylindrical lower part projecting below the lower end of the body and having said passageway for the discharge of the liquid, said projecting portion of said stem being externally screw threaded, and in which said reciprocating means includes a power-actuated actuator for imparting a to-and-fro motion, and a pair of spaced followers relatively adjustable on said screw threads and receiving said actuator between them to cause reciprocation of the element.

8. The combination of claim 3 in which said piston has a resilient peripheral portion to exert sufficient pressure on the wall of said chamber to frictionally hold the piston when it is mounted for vertical reciprocation, and in which said element comprises a stem with a cylindrical lower part having a friction sliding fit in said bore of the piston, the differential of friction between these frictionally engaged parts permitting movement of the stem without imparting movement to the piston until the piston is engaged by one of said abutments.

9. The combination of claim 8 in which said piston is made of two abutted half sections of a resilient plastic material, each section having a hub portion, a web portion and a tapered angularly projecting wing portion, said bore being formed in the two hub portions and said wing portions on the two half sections projecting outwardly in opposite directions and forming said resilient peripheral portion of the piston.

10. The combination of claim 3 in which said body has a tubular guide depending from the bottom of said body and concentric with said chamber, the lower of said element extending through and below said guide, said second abutment being slidable in said guide.

11. The combination of claim 3 in which said lower liquid passageway includes a lateral discharge valve port which coacts with said piston and a longitudinally extending discharge bore in said lower part of the element, the lower end of the last mentioned bore opening through the lower end of the element for the discharge of liquid from the dispenser, the upper end of said last mentioned bore being open and disposed at the normal level of the liquid in the piston chamber when said piston is in a lowered position, said element having means affording communication between said valve port and said discharge bore and through which the liquid must travel upwardly before entering the open top of said discharge bore.

12. The combination of claim 3 in which said lower part of said element is a cylindrical tube with a plug closing the upper part of its bore, said tube having a lateral discharge valve port which coacts with said piston and which is spaced downwardly from said plug, an anti-bleed tube inserted in the lower end of said cylindrical tube and terminating in spaced relation to said plug, said anti-bleed tube having a liquid discharge bore extending from end to end, the upper end portion of said anti-bleed tube being reduced in diameter from said valve port to its upper extremity; said valve port, said bore in said anti-bleed tube and the space in the cylindrical tube surrounding said reduced upper end and said valve port forming the said passageway in the element for the discharge of liquid from the piston chamber.

13. In a metering liquid dispenser, the combination of an upright cylindrical body forming a piston chamber and having a closed top with a central bore and a bottom with a depending concentric tubular guide, a free piston slidable in said chamber and having a central bore, said piston being normally held against reciprocation by the frictional engagement of it with the wall of said chamber, a reciprocable valve rod having cylindrical upper and lower portions, the upper portion being slidable in said bore of the top of the body and having a liquid inlet passage extending downwardly from its top to a lateral inlet valve port which opens into said chamber in a lowered position of said rod and which is closed by said top in a raised position of the rod, means for mounting the top of the body in an opening in the bottom of a liquid supply receptacle, said lower portion of the valve rod being slidable in said bore of the piston and extending downwardly through and below said tubular guide, said lower portion of the valve rod being formed with a liquid discharge passage extending upwardly from its lower end and being in communication with a lateral discharge valve port which opens into said chamber in a raised position of the rod and which is closed by the piston in a lowered position of the rod, a first abutment collar on said rod above the piston and adapted to move the latter downwardly during at least a part of the downstroke of the rod, a second abutment collar on said rod slidable in said tubular guide and adapted to move the piston upwardly during at least a part of the upstroke of the rod, and means at the projecting lower end of said rod for reciprocating the rod.

14. The combination of claim 13 in which said rod reciprocating means comprises a power-actuated actuator for imparting to-and-fro movement and longitudinally spaced followers on said rod receiving said actuator between them and alternately moved by said actuator, at least one of said followers being adjustable to vary the space between them.

15. The combination of claim 13 in which the lower projecting portion of said rod is externally screw threaded and in which said reciprocating means comprises a power-actuated actuator for imparting a to-and-fro motion and a pair of spaced follower elements relatively adjustable on said screw threads and receiving said actuator between them to cause reciprocation of said rod.

16. The combination of claim 13 in which said piston is made of resilient plastic material, at least the central portion of said top of the body is made of resilient plastic material and has therein said bore of the top of the body and said first abutment collar is cylindrical and has dished upper and lower ends to engage plastic material portions of the top of the body and the piston.

References Cited in the file of this patent

UNITED STATES PATENTS

| | | |
|---|---|---|
| 1,809,813 | Kantor | June 9, 1931 |
| 2,309,446 | Ekkebus | Jan. 26, 1943 |
| 2,823,500 | Brown | Feb. 18, 1958 |

FOREIGN PATENTS

| | | |
|---|---|---|
| 876,658 | Germany | May 15, 1953 |